Aug. 17, 1943.  F. G. SCHWEISTHAL  2,327,221
INDICATOR
Filed March 21, 1939  2 Sheets-Sheet 1
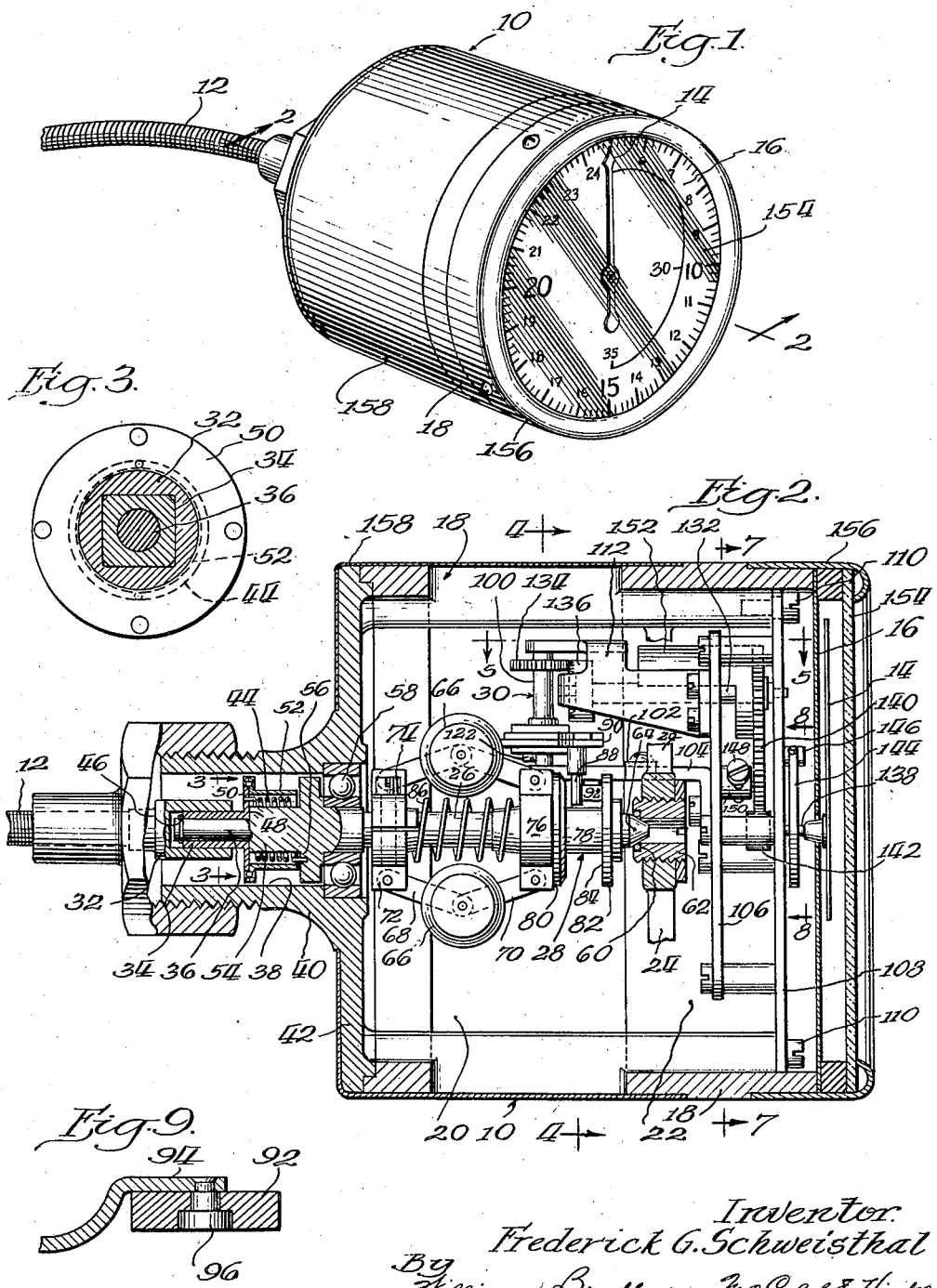
Inventor:
Frederick G. Schweisthal
By Williams, Bradbury, McCall & Hinkle
Attys.

Aug. 17, 1943.    F. G. SCHWEISTHAL    2,327,221
INDICATOR
Filed March 21, 1939    2 Sheets-Sheet 2
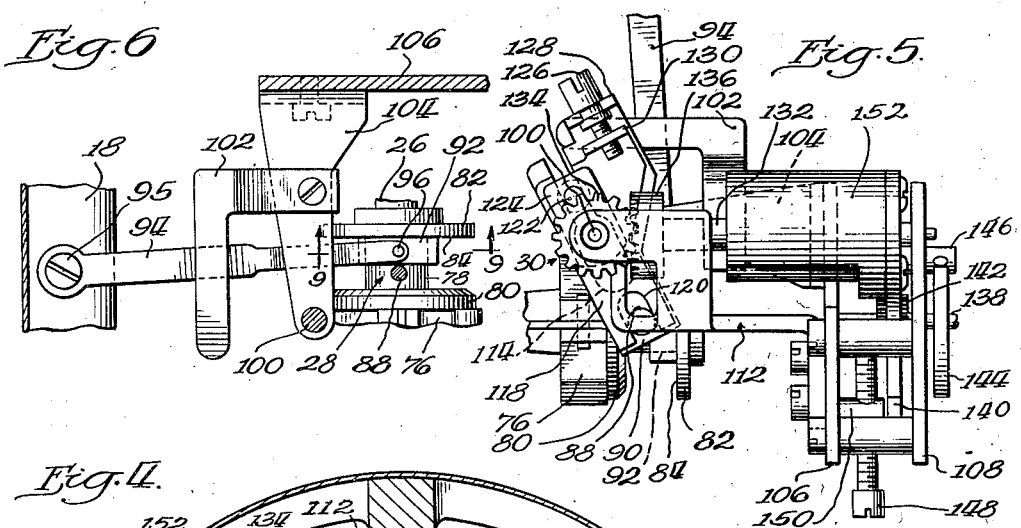
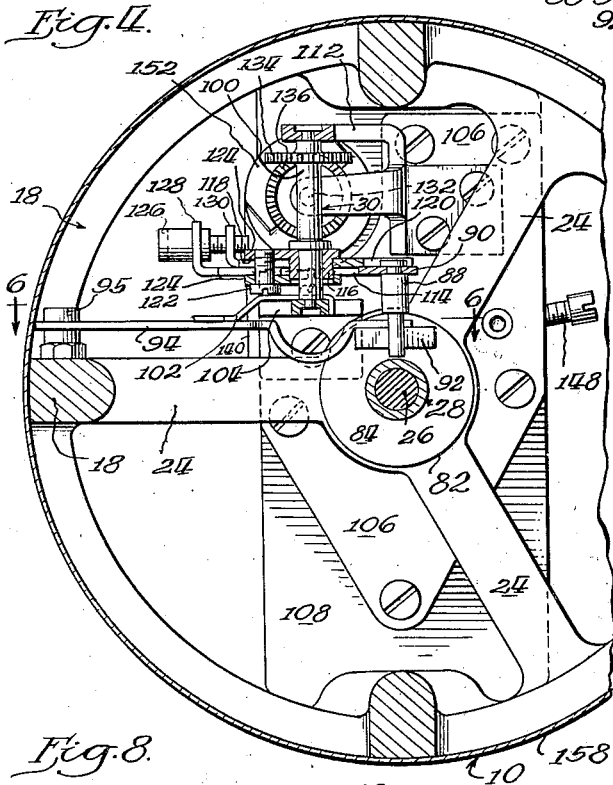
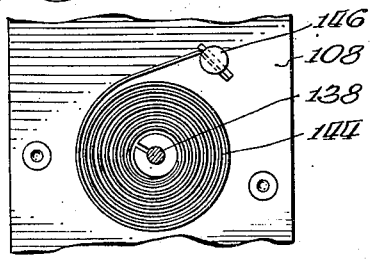
Inventor:
Frederick G. Schweisthal
By Williams, Bradbury,
McCoel & Hinkle
Attys.

Patented Aug. 17, 1943

2,327,221

UNITED STATES PATENT OFFICE 2,327,221

INDICATOR

Frederick G. Schweisthal, Chicago, Ill., assignor to Stewart-Warner Corporation, Chicago, Ill., a corporation of Virginia Application March 21, 1939, Serial No. 263,259

8 Claims. (Cl. 264—15)

The present invention relates to indicators in general, and more particularly to indicators of the type known as centrifugal tachometers.

In the conventional centrifugal tachometer comprising a rotatable governor shaft, a centrifugally actuated governor collar movable axially of the shaft in response to variations in the speed of the rotation of the shaft, and a pin and lever connection from the collar to indicator pointer actuating gears, it is necessary, in order to obtain sufficient pointer movement to keep within a desired degree of accuracy, that the lever have a considerable range of angular movement. However, the greater the angular movement of the lever, the greater the inaccuracy of the readings because of certain angular and frictional relationships existing between the aforementioned collar, lever and pin. Ordinarily, the pivot point of the pin supporting lever is located so that the lever assumes approximately equal angles with respect to the collar at both extremes of movement of the latter. When the lever is at one extreme or the other and the collar is rotating in a direction toward the pivot point of the lever, the frictional force created by the rotation of the collar against the pin tends to thrust the lever in such a direction as to increase the angle therebetween and the face of the collar. This thrust or jamming results in an undesired movement of the lever, and, consequently, in inaccurate readings because the indicator is moved, not solely in response to the speed of rotation as it should be, but also in response to the frictional force imparted thereto by the collar. This frictional force is proportional to the speed and direction of rotation and, likewise, to a trigonometric function of the angle between the lever and a plane passing through the face of the collar.

It is the primary object of the present invention to provide a new and improved indicator in which the aforesaid disadvantages are substantially eliminated.

A more specific object of the present invention is to provide a new and improved indicator in which the indicator pointer actuating pin and lever are movable through the desired angular distances and in which the undesired cramping or jamming with its resulting inaccuracy is obviated.

A further object of the present invention is to provide a new and improved indicator in which the frictional forces created by the rotation of the collar against the pin are decreased and transmitted, not to the pin and lever, but to the frame of the indicator.

Further objects and advantages of the present invention will become apparent from the ensuing description, in the course of which reference is had to the accompanying drawings, in which:

Fig. 1 is a perspective view of the indicator;

Fig. 2 is an axial cross sectional view through the indicator taken along the line 2—2 of Fig. 1;

Fig. 3 is a partial transverse cross sectional view through a portion of the driving connection between a flexible shaft connecting the indicator governor shaft to a part, the speed of which is to be indicated. The view is taken along the line 3—3 of Fig. 2;

Fig. 4 is a transverse cross sectional view taken along the line 4—4 of Fig. 2, illustrating the details of the construction of the adjustability of the lever of the pin and lever connection which is located between the pointer and the governor mechanism;

Fig. 5 is a partial top elevational view of the mechanism shown in Fig. 4 and is taken along the line 5—5 of Fig. 2;

Fig. 6 is a partial horizontal cross sectional view taken along the line 6—6 of Fig. 4;

Fig. 7 is a partial transverse cross sectional view taken along the line 7—7 of Fig. 2, illustrating the minimum reading stop;

Fig. 8 is a view similar to Fig. 7 taken along the line 8—8, illustrating the hair spring utilized to return the pointer to its minimum reading position and for maintaining the pin of the pin and lever connection in contact with the shoe, and the shoe in contact with the face of the governor collar during normal operation of the indicator; and Fig. 9 is a sectional view of the shoe taken on the line 9—9 of Fig. 6.

Referring now to Fig. 1, it may be noted that the indicator of the present invention comprises a housing 10, adapted to contain the various operating parts of a centrifugal tachometer. The operating parts are rotated by a relatively long flexible shaft 12 at a speed proportional to the speed of a part, the speed of which it is desired to have an indication, such as a part of an air craft engine. The indicator comprises a pointer 14, adapted to be rotated through an angle of 540 degrees and having associated therewith a dial 16 carrying two suitably subdivided scales reading from 500 to 3,500 R. P. M. The scale is recognizable as being of the type ordinarily used in indicators utilized for indicating the speed of air craft engines.

Referring now more particularly to Figs. 2 and 4, it may be seen that the indicator 10 comprises a metallic frame 18 subdivided into two compartments 20 and 22 by a three-armed bridge support 24. The compartment 20 is best termed the governor compartment for the reason that it houses the governor mechanism utilized in transforming the rotation of a governor shaft 26 into linear movement of a governor collar, indicated generally by reference character 28, and mounted for rotation upon and axial movement relative to the governor shaft. The compartment 22 may be termed the indicator compartment for the reason that it houses certain of the indicator actuating gears as well as supports the pointer 14.

It may be well to mention at this point that the governor mechanism per se corresponds in many details to apparatus that is well known in the art, and that the primary feature of the present invention resides in the means provided for the purpose of eliminating inaccuracies resulting from the engagement of the collar 28 with the linkage and gear mechanism, indicated generally by reference character 30, utilized for transmitting movement of the collar to the indicator 14. The details of the governor mechanism as well as of the above-mentioned primary feature of the present invention will be described in greater detail after a description of the driving connection between the governor shaft 26 and the flexible shaft 12.

The shaft 12 terminates in a female plug member 32 (see Figs. 2 and 3), having a square bore and adapted to receive a driven member 34 rotatably mounted upon a reduced portion 36 of the governor shaft and extending into a bore 38 of a relatively small diameter located within a reduced portion 40 of an end plate 42 comprising part of the indicator frame 18.

The driving connection between the driven member 34 and governor shaft 26 is so constructed and arranged that when the torque transmitted therethrough in either direction of rotation of the driven member is less than a predetermined value, the drive is resilient in nature, but when the torque exceeds the predetermined value, the drive becomes substantially positive. The driving connection includes resilient means, in this case a helical spring 44, having associated therewith means preventing expansion or contraction thereof beyond a predetermined extent when the torque transmitted therethrough exceeds a certain value in a manner to be described shortly. The driven member 34 is constrained against any substantial axial movement upon the governor shaft 26 by means of a small annular spring 46, mounted in a groove formed near the extreme end of the governor shaft, and a shoulder 48 upon the governor shaft against which abuts a radial flange 50, preferably formed as an integral part of the driven member 34.

The drive is rendered substantially positive when the torque transmitted in one direction exceeds a predetermined value by a tubular member 52, concentric with respect to the governor shaft and spaced from the spring when the latter is in a relaxed state, against which the spring is expanded. The drive is rendered substantially positive when the torque transmitted in the opposite direction exceeds a predetermined value by the contraction of the spring 44 about an intermediate portion 54 of the governor shaft from which the spring is spaced when relaxed. The spring 44 has one end connected to the flange 50 of the driven member and the other end to a shoulder 56 formed integrally with the governor shaft.

The governor shaft is rotatably mounted in the indicator housing by ball bearings 58 housed within the end plate 42 of the housing and ball bearings confined within an annular groove 60, formed in a ball race 62 adjustably mounted in the bridge 24, by the conical end 64 of the governor shaft. The conical end of the shaft and the bearings confined by it perform the functions of guide and thrust bearings.

The governor collar 28 is moved axially of the governor shaft in response to the speed of the governor shaft by a plurality of weights 66, two of which are shown, each pivotally mounted upon a pair of arms 68 and 70. The arms 68 are pivotally mounted upon a weight support 72 adjustably secured directly to the governor shaft by a screw 74. The arms 70 are pivotally secured to a second weight support 76 fixedly secured to a governor sleeve 78 comprising a pair of spaced apart collars 80 and 82 and constituting therewith the governor collar 28. The collar 80 is preferably formed integrally with the sleeve and made of brass, while the governor collar 82 is preferably made of steel and provided with a substantially flat face 84 for a purpose to be described shortly. It is pressed upon the sleeve. The sleeve and collar occupy a position substantially such as that indicated in Fig. 2 when the governor shaft is not rotating, to which position it is actuated by a governor spring 86 surrounding the shaft and located between the two governor weight supports 72 and 76.

As hereinbefore stated, the primary object of the present invention is the transfer of movement of the collar to the indicator pointer in a manner to avoid the inaccuracies that might be created by the frictional forces, created by the contact of the governor collar with the ordinary pin and lever connection utilized to transfer the movement of the collar to the indicating pointer. This object is attained by interposing between the collar 82 and pin 88, which is supported upon a lever 90, a shoe 92 pivotally secured to a relatively long lever 94 by a pin 96, as clearly illustrated in Fig. 9. The shoe is made of bronze, or other suitable material, and has a flat side adapted to engage the flat face 84 of the collar 82 with which it is maintained in contact by suitable biasing means hereinafter described, so that it follows the movement of the collar and transmits the movement to the pin and lever connection. The lever 94 is relatively long, as compared to the length of the pin supporting lever 90 and it is pivotally mounted upon the frame 18 by a screw 95, as may be seen best from Figs. 4, 5, and 6.

The lever 90, which is pivotally mounted upon a vertical shaft 100, is, therefore, movable over relatively large angular distances, as compared to the movement of the lever 94. This is desirable because it has been found in practice that it is essential that the lever 90, transmitting the motion of the collar to the indicator, travel over considerable angular distances. The shaft 100, upon which the lever 90 is pivotally mounted, is so located with respect to the governor collar that the angle between the lever and face 84 of the collar is quite large at both extremes of movement of the collar. In the construction disclosed the angle with the collar at its extreme right is somewhat smaller than the angle when the collar is at its extreme left, as viewed in Fig. 2. The frictional forces created by rotation of the collar 82 are not transmitted to the pin 88 because of the interposition of the shoe 92. Furthermore, the frictional forces are decreased considerably by reason of the fact that the lever 94 is at a very small angle with respect to the collar 82, and the frictional forces that are created are transmitted directly to the frame 18 of the housing 10 upon which the lever 94 is mounted, as clearly shown in Fig. 6.

Rotation of the governor collar also exerts an upward force upon the lever 94, and in order to prevent such force from moving the lever, there is provided a substantially right angled guide rail 102, which is adapted to bear relatively lightly against the upper surface of the lever. The rail is so constructed and arranged that it does not prevent pivotal movement of the lever 94 about its mounting. The rail is suitably secured to a bracket 104 extending substantially axially of shaft 26 and affixed to a vertically disposed supporting plate 106, supported in turn from a second vertically disposed supporting plate 108 secured by a plurality of screws 110 directly to the front end of the housing 18, as shown best in Figs. 2 and 7.

The vertical shaft 100 supporting the pin and lever connection is supported at its lower end in the bracket 104, and at its upper end in a somewhat similar bracket 112 likewise secured to the supporting plate 106.

The lever of the pin and lever connection 88—90 is made adjustable in length in order to provide means, utilized in calibrating the indicator, for adjusting the relation of the movement of the indicator needle to the movement of the collar. The construction of the pin and lever connection and the adjusting means may be ascertained best by reference to Figs. 2, 4 and 5. Referring now to these figures, it may be seen that the lever 90 is provided with a central relatively long groove 114, whereby the lever 90 is made movable with respect to the shaft 100 and a collar 116 attached thereto. The collar supports a fixed arm 118 provided with a groove 120 at one end thereof for the reception of a part of the pin 88. The lever 90 and arm 118 are, therefore, adjustable relative to one another and are normally maintained in adjusted relationship by a locking screw 122 and a pair of arms 124. When the locking screw 122 is loosened, the length of the lever arm 90 may be varied by rotation of an adjusting screw 126 rotatably mounted in a projection 128 formed at the end of the lever and extending at right angles therefrom and in threaded engagement with a similar projection 130, formed at the adjacent end of the arm 118.

The angular movement of the shaft 100 is transmitted to the indicator through a shaft 132 connected to the shaft 100 by a pair of gears 134 and 136 and to the pointer shaft 138, by a relatively large sector gear 140 and a relatively small pinion gear 142 affixed directly to the pointer shaft. The pointer shaft is rotatably mounted in the supporting plates 106 and 108. A hair spring 144 is provided to return the pointer to its minimum reading position (in this case 500 R. P. M.) which is determined by the setting of a minimum reading stop 148, threaded into a stud 150 mounted upon the supporting plate 108 and mounted to engage a pin 141 mounted upon sector gear 140. The shaft 132 is provided with a counterweight 152 and is rotatably supported by the bracket 112, which also supports the vertically disposed shaft 100, and by the supporting plate 108.

The dial 16 is protected by the usual glass plate 154 held in place by a bezel 156 suitably secured to the indicator frame. If desired, a finished appearance to the indicator housing may be obtained by covering a major portion thereof with a relatively thin metal cup-shaped shell 153, as illustrated in Figs. 1 and 2.

After the instrument has been assembled it may be calibrated by adjustment of the length of lever 90 or of the location of the weight support 72 upon the governor shaft. The first adjustment is accomplished by first loosening the locking screw 122 and then rotating adjusting screw 126. The second adjustment is effected by loosening screw 74 and then shifting the weight support.

Upon installation of the instrument, as in an airplane to indicate engine speed, the flexible shaft 12 is connected to the engine and the governor shaft 26 is driven by the flexible shaft through the helical spring 44, in a manner heretofore described in detail. The rotation of shaft 26 at speeds proportional to the engine speed effects linear movement of the governor collar 28.

Coming now to the description of the operation of the means for transmitting the movement of the collar to the indicator pointer and indicator shaft, it may be seen that the shoe 92, interposed between the flat face 84 of the collar 82 and the pin 88, is maintained in contact with the face by the pin 88 which, in turn, is maintained in abutment with the other side of the shoe 92 by the hair spring 144 acting through certain of the previously described gears and shaft. Consequently, as the weights 66 are moved radially in response to variations in the speed of the rotor shaft, the sleeve 78 is moved accordingly either against or by the spring 86. The shoe 92 is at all times maintained in contact with the steel collar 82 and the movements of the collar are transmitted faithfully to the indicator. The frictional forces created by contact of the rotating collar with the shoe are transmitted, not to the pin 88 and the indicator, but to the lever 94 and through it to the indicator frame. Since the angle between the lever and the face of the collar is relatively small, the frictional force is likewise decreased proportionately. Upward movement of the lever 94 is prevented by the guide rail 102 so that accurate readings are obtainable at all times.

The above specifically described embodiment of the invention is illustrative and not limitative of the invention. It should be obvious to those skilled in the art that features of the present invention are applicable not only to centrifugally actuated tachometers but to other types of indicators as well. Furthermore, the particular centrifugally actuated tachometer may be modified in various ways without departing from the spirit of the invention in any way.

What I claim as new and desire to secure by Letters Patent is:

1. In an indicator, the combination including, an indicator element, means including a pivotally mounted element for imparting movement to said element, and means including a rotatable, axially movable member and a shoe mounted for movement axially with said rotatable member interposed between said rotatable member and said pivotally mounted element for actuating said indicator element, and a support mounting said shoe independently of and in contact engagement with said pivotally mounted element and rotatable member, whereby frictional force created by contact between said shoe and rotatable member are transmitted to said support.

2. In an indicator, the combination including, an indicator element, means including a pivotally mounted element for imparting movement to said indicator element, and means for actuating said pivotally mounted element over a relatively wide angle in response to variations of a characteristic to be indicated, said means including a rotatable and axially movable member, a shoe interposed between said member and said pivotally mounted element, a pivotally mounted lever for supporting said shoe independently of said pivotally mounted element, said lever being of a length and so arranged with respect to said rotatable and axially movable member that the angle between the latter and the lever is relatively small as compared to the angular movement of said pivotally mounted element, and means for maintaining said shoe in contact with said member, and said pivotally mounted element in contact with said shoe during normal operation of the indicator.

3. In an indicator, the combination including, an indicator element, means including a pivotally mounted element for imparting movement to said indicator element, and means for actuating said pivotally mounted element over a relatively wide angle in response to variations of a characteristic to be indicated, said means including a rotatable and axially movable member, a shoe interposed between said member and said pivotally mounted element, a pivotally mounted lever for supporting said shoe, and means for maintaining said shoe in contact with said member, and said pivotally mounted element in contact with said shoe during normal operation of the indicator, said pivotally mounted element being relatively short and movable over considerable angular distances on each side of the line passing through the pivot point of the element perpendicular to the axis of rotation of the rotatable member, said pivotally mounted lever being relatively long, whereby the shoe is moved through relatively small angular distances as compared to the movement of said element, and the pivot point of said lever being located so that the angle between the lever and the face of the rotatable member against which said shoe bears is relatively small.

4. In an indicator, the combination including, an indicator element, a pivotally mounted element mechanically connected to said indicator element for imparting movement thereto, a shaft rotatable at a speed proportional to a characteristic to be indicated, a collar mounted for rotation with said shaft and movable axially thereof in response to variations in said characteristic, a shoe interposed between said collar and element, means mounting said shoe pivotally independently of said collar and element, and biasing means for normally maintaining said element in contact with said shoe and said shoe in contact with said collar, whereby the contact engagement of the shoe with said element and collar and the independent mounting of the shoe prevent transmission of frictional forces to said element.

5. In an indicator, the combination including, a frame, an indicator element rotatably mounted upon said frame, means including a lever pivotally supported by said frame for transmitting movement to said indicator element, and means for actuating said lever over a relatively wide angle in response to variations of a characteristic to be indicated, said means including a rotatable and axially movable member having a substantially flat face, a shoe interposed between said member and lever and adapted to abut against said face, a second lever pivotally mounted upon said frame for supporting said shoe, and means for maintaining said shoe in contact with said face, and said first-mentioned lever in contact with said shoe during normal operation of the indicator, said first-mentioned lever being relatively short and movable over considerable angular distances on each side of a line passing through the pivot point of the lever and perpendicular to the axis of rotation of said member and the second-mentioned lever being relatively long, whereby the shoe is moved through relatively small angular distances as compared to the movement of said element, and said second-mentioned lever being mounted pivotally upon said frame and its pivot point being located so that the angle between the lever and the face of the rotatable member against which said shoe bears is relatively small.

6. In an indicator, the combination including, a frame, an indicator element mounted on said frame, an element pivotally mounted on said frame and mechanically connected to said indicator element for imparting movement thereto, a shaft rotatable at a speed proportional to a characteristic to be indicated mounted on said frame, a centrifugally actuated collar rotatable with and slidable along said shaft in response to variations in said characteristic, said collar having a relatively smooth face, a shoe interposed between said collar and element, and adapted to bear against said face, means pivotally mounting said shoe upon said frame independently of said collar and element, and biasing means for normally maintaining said element in contact with said shoe and said shoe in contact with said collar, said pivotally mounted element being movable over a relatively wide angle with respect to the face of said collar and said shoe mounting means being movable over a relatively small angle with respect to the face of said collar.

7. In an indicator, the combination including, an indicating element, means for imparting movement to said element, a rotatable member movable axially along its axis of rotation, a shoe, a pivotally mounted lever supporting said shoe between and independently of said member and means, means biasing said first-mentioned means into contact with said shoe and said shoe into contact with said member, and means associated with said lever permitting pivotal movement thereof and restraining transverse movement thereof occasioned by contact with said rotatable member.

8. In combination, a movement transmitting member pivotally mounted for angular movement in a predetermined plane, a member rotatable about an axis substantially parallel to said plane and operable to actuate said movement transmitting member over a relatively wide angle, a shoe located between and in contact with both said members, and means supporting said shoe independently of both members, whereby frictional forces created by rotation of said rotatable member in contact with said shoe are transmitted to the shoe support.

FREDERICK G. SCHWEISTHAL.